Patented July 13, 1937

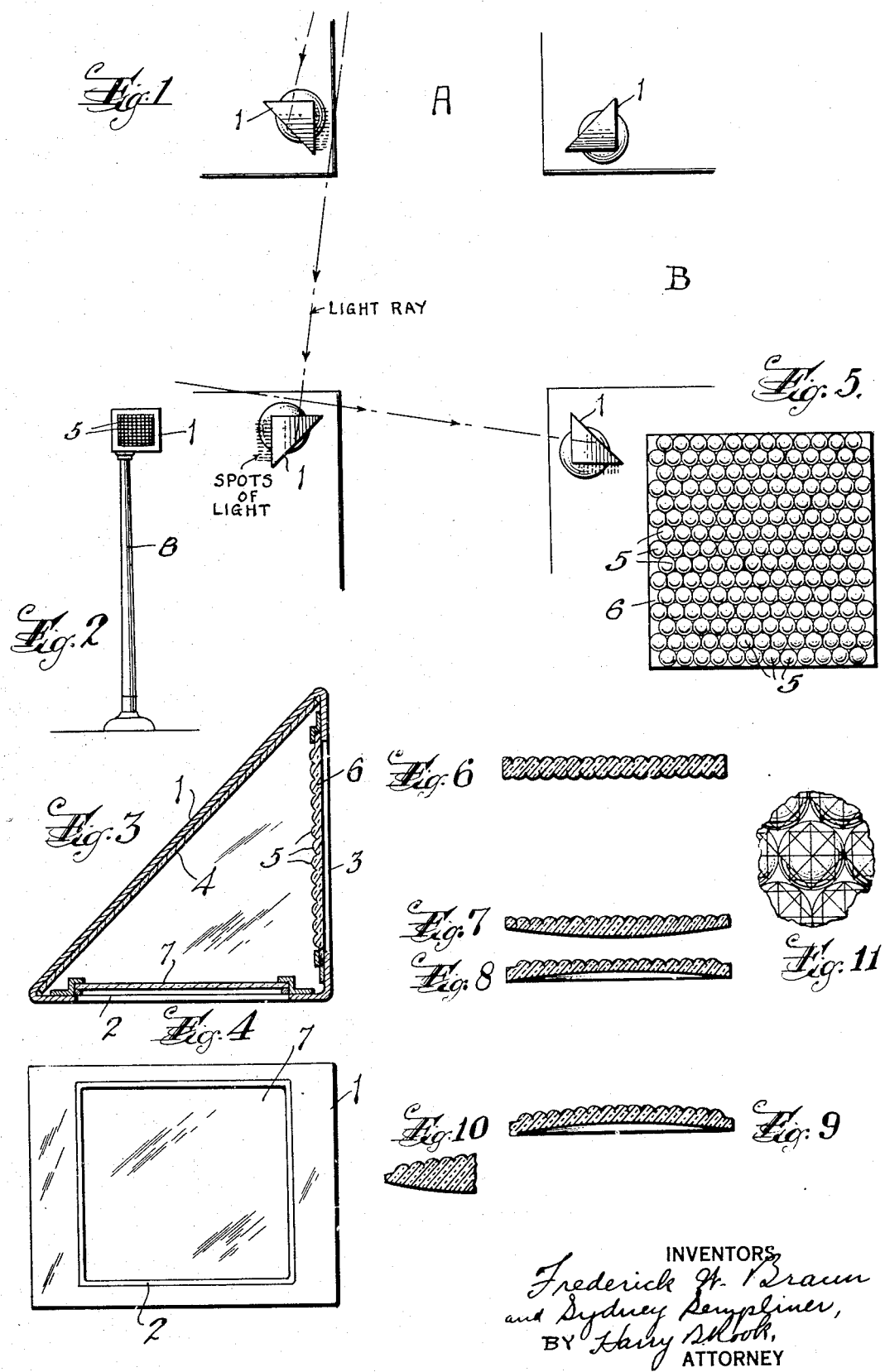

2,086,598

UNITED STATES PATENT OFFICE 2,086,598

REFLECTING SIGNAL

Frederick Wolfe Braun, Newark, and Sydney Sempliner, Hillside, N. J.

Application June 8, 1934, Serial No. 729,674

1 Claim. (Cl. 88—82)

This invention relates to street or roadway signals particularly for use at points where streets or roads intersect, cross, or meet at angles. The signal is especially designed for use at night and to be operated by the reflection of light rays from the lights of vehicles approaching the signal and without the necessity for either a lamp or an operating mechanism, whereby the light from vehicles approaching the signal from different angles will illuminate the signal to warn the driver of each of said vehicles of the approach of the other vehicles.

The present application also relates to our United States Patent No. 1,966,880 of July 17, 1934.

The signal in general consists of a casing having two openings with their axes at angles to each other, and a reflector in such casing diagonally facing said openings so that a ray of light projected into one opening from one direction will be reflected outwardly from the other opening in another direction. In operation of signals of this general type it has been difficult to "pick up" a sufficiently large portion of the beam of light from an automobile approaching the signal from one side to provide an adequately intense or clearly visible signal for an automobile driver approaching the signal from the other direction. This is true particularly because the signals are generally placed at one side of the roadway and the automobile approaches the signal at one side thereof.

One object of our present invention is to provide a signal of the general character described embodying novel and improved features of construction whereby a ray of light will be transformed in the signal into a plurality of intense spots of light each of which is in effect an image of the ray or beam, so that should only a portion of the beam of light from an automobile approaching the signal be picked up by the signal this portion of the beam will be multiplied many times so as to be clearly visible to the driver approaching the signal from a direction at angles to that in which the beam is directed upon the signal.

Other objects are to provide in such a signal a novel and improved combination of a reflector and a plurality of closely spaced small lenses in one of said openings each to produce an independent image of a beam of light projected into either opening; and to obtain other advantages and results as will be brought out by the following description.

Referring to the accompanying drawing in which corresponding and like parts are designated throughout the several views by the same reference characters, Figure 1 is a plan view of a street intersection having a plurality of signals embodying our invention.

Figure 2 is a side elevation of one of the signals.

Figure 3 is an enlarged horizontal sectional view through one of the signal casings.

Figure 4 is a side elevation of the casing shown in Figure 3.

Figure 5 is a detached plan view of the transparent plate having the plurality of small lenses.

Figures 6, 7, 8, 9 and 10 are transverse sectional views through modified forms of the transparent plate, and Figure 11 is an enlarged fragmentary plan view of a further modification of the transparent lens plate.

Specifically describing the illustrated embodiment of the invention, the signal comprises a casing 1 which is preferably triangular in plan view and has two openings 2 and 3 disposed with their axes at an angle to each other, preferably at an angle of ninety degrees. Within the casing and diagonally facing each of the openings, preferably at an angle of forty-five degrees to the axes of the openings, is a reflector 4. In one of the openings, in the present instance the opening 3, is arranged a plurality of closely spaced small lenses, each of which is capable of producing an independent image of a beam of light projected into either opening. Preferably these lenses are circular in plan view and the perimeter of each lens is tangential to the perimeters of adjacent lenses, as shown in Figure 5. It is desirable that the lenses 5 be formed integrally with and on one surface of a transparent plate 6, the plate being disposed in the opening so as to close the same as shown in Figure 3.

The other opening may be left open, although to prevent accumulation of dirt in the casing this opening is preferably closed by a sheet of glass 7. This sheet of glass may be colored if desired, as may also the plate 6 and lenses 5.

In operation, each signal casing may be mounted at one of the corners of two intersecting streets A and B, and as shown, the casings are mounted on pedestals 8 with each of the openings 2 and 3 facing in one of right angularly disposed directions. As shown, the signals are so arranged that the rays of light from the headlights of an automobile approaching the intersection from either direction on either of the streets A and B, will be reflected in both directions along the other street so as to warn the driver of the automobile on either street of the approach of the vehicle on the other street. A beam of light entering the casing through either opening 2 or 3 will be multiplied into a plurality of spots or images, one on each lens 5, and the lenses being small and closely spaced when the signal is viewed from a distance the transparent plate 6 or group of lenses 5 will appear to be illuminated over the whole area thereof so as to provide a large mass of light. All spots or images will be substantially equally brilliant, and the effect of all of the spots viewed from a distance will be that of a mass of scintillating brilliant light, especially due to the vibration or movement of the beam of light as the result of vibration of a moving automobile which will cause a slight movement of the spots on the lenses. Accordingly, even a small section of the beam of a light from a vehicle approaching the signal from one direction will be reflected in the other direction so as to be clearly visible. Furthermore, the signal makes it possible to pick up a sufficient portion of the beam of light from an approaching automobile even when the automobile is at a considerable distance to one side of the signal. This appears to be the result of the spherical lenses which will pick up light rays or reflect light rays when the source of light is at considerable distances above, below or at either side of the axes of the lenses.

As shown in Figures 3 and 5, the lenses 5 are preferably plano-convex, and are arranged in a common plane as when the plate 6 is flat. However, the lenses may be in the form of cylinders having opposed convex ends as in Figure 6. Also, the plate 6 may be plano-convex or plano-concave as shown in Figures 7 and 8 respectively. Figure 9 shows another configuration of lens plate and combination thereof with convex lenses, and Figure 10 shows a double convex plate with convex lenses.

If desired, the various lenses 5 may be faceted as shown in Figure 11.

In all forms of the invention, the essence is the provision of a plurality of closely spaced images or spots of light produced by the projection of a beam of light upon the plurality of lenses through either opening of the casing. When the light is projected through the opening 3, the images are reflected by the reflector 4 through the opening 2, while a light beam passing through the opening 2 is reflected upon the plurality of lenses which transform the beam into a plurality of spots of light or images of the beam.

Having thus described our invention, what we claim is:

Means for inaugurating a warning roadway crossing signal from either of two angularly disposed directions, comprising a casing having two openings with their axes at an angle to each other, said casing being mounted with one of said openings facing in each of said directions, a reflector in said casing diagonally facing said openings, one of said openings having a plate carrying a plurality of closely spaced convex lenses whereby a beam of light projected into said opening having the lenses is formed by said lenses into tiny spots of light which are reflected through the other opening and a beam of light projected into the last-mentioned opening is reflected through said lenses from the first-mentioned opening in the form of tiny spots of light.

FREDERICK. W. BRAUN.
SYDNEY SEMPLINER.